United States Patent [19]

Pattarini et al.

[11] 4,172,466
[45] Oct. 30, 1979

[54] SELF-ACTUATED PILOT-CONTROLLED SAFETY VALVE

[75] Inventors: Daniel M. Pattarini, Glen Cove; Andrew L. Szeglin, Ronkonkoma, both of N.Y.

[73] Assignee: Target Rock Corporation, Melville, N.Y.

[21] Appl. No.: 812,122

[22] Filed: Jul. 1, 1977

[51] Int. Cl.² .......................................... F16K 31/383
[52] U.S. Cl. .................................... 137/488; 137/489; 137/495
[58] Field of Search ................ 137/489, 488, 102, 495

[56] References Cited

U.S. PATENT DOCUMENTS

| 231,214 | 8/1880 | Curtis | 137/489 |
|---|---|---|---|
| 859,920 | 7/1907 | Cunning | 137/489 |
| 2,587,212 | 2/1952 | Placette | 137/495 X |
| 3,099,285 | 7/1963 | Berz | 137/489 X |
| 3,294,111 | 12/1966 | Abercrombie | 137/102 X |

*Primary Examiner*—Alan Cohan
*Attorney, Agent, or Firm*—Eisenman, Allsopp & Strack

[57] ABSTRACT

There is disclosed a self-actuated pilot-controlled pressure-responsive valve for fluid pressure systems wherein the main valve is arranged to be seated by the fluid pressure in the system and a normally balanced piston and cylinder assembly pulls the main valve from its seat in response to elevated system pressure in a spring-loaded, tandem pilot and stabilizing valve assembly which in turn establishes a driving pressure differential across the piston, with the initial unseating of the pilot valve occurring substantially independently of the stabilizing valve which thereafter closes to hold the pilot valve open until reduced system pressure is achieved. At this time, the tandem valves operate as one with the pilot valve closing and the stabilizing valve opening against a force derived from system pressure through a conduit having a metering orifice which effects a pressure drop in the tandem valve assembly which insures full and chatter-free operation until the main valve is again closed.

4 Claims, 2 Drawing Figures

SELF-ACTUATED PILOT-CONTROLLED SAFETY VALVE

BACKGROUND OF THE INVENTION

The invention relates to relief valves for relieving excess pressure from fluid pressurized systems.

A conventional pressure relief valve in its simplest form includes a valve seated by an adjustable compression spring against the force of the fluid pressure of the system it protects. More sophisticated designs include internal mechanisms which require adjustment when the system fluid is changed. However, when adjusted for one fluid, such valves tend to become unstable when called on to handle another. In addition, repeat accuracy of the set or blow-off point is difficult to achieve in large spring-loaded valves because of non-uniform heating of the large, set-pressure adjustment spring. Pilot-controlled relief valves which utilize low-lift pilot control stages have been evolved to overcome certain of the functional problems of large valves, but pilot valve leakage in such designs could cause premature operation.

Accordingly, among the objects of the present invention are the provision of a relief valve design which is capable of consistent operation with a wide variety of system fluids; the provision of a reliable relief valve in which the seating force increases in direct proportion to increasing system pressure until the pressure set for blow-off is reached; and the provision of a relatively leak-free valve, the operation of which is characterized by full opening pop action.

A further object of the invention is to provide readily serviceable relief valve design for high pressure systems in which the control of the main relief valve is effected through pilot valve controls which, together with the main valve, are self-actuated by the fluid pressure of the system. A further object of the invention is to provide a relief valve assembly, the action of which is controlled by the pilot-control valve means which are themselves highly insensitive to leakage to such an extent that a substantial leak in the control system will not result in the inadvertent operation of the main pressure relief valve.

A further object of the invention is to provide a relief valve design such that the valve will open by direct action of the fluid pressure on the main valve and will relieve at the rated capacity in the event of failure of any essential part of the pilot valve.

SUMMARY OF THE INVENTION

In accordance with the invention, there is provided a pressure relief valve system including a main pressure relief valve preferably so arranged that the fluid pressure in the system forces the valve against its seat. The valve is lifted from the seat in a full opening pop action by means of a piston assembly coupled to the valve and having a predetermined larger effective area and across which the system pressure is normally balanced until blow-off.

The differential pressure across the piston is controlled by a separately serviceable pilot and stabilizing tandem valve system which is energized through suitable ducts to the main pressure line of the system being protected and which includes a pressure chamber fed by a duct common to two valves, one of which has its disc seated under the force of an adjustable spring assembly. When opened by sensing critical pressure within the system, it vents the chamber to the atmosphere. At this time, a stabilizing disc, which is normally unseated against the chamber pressure, seats by virtue of a separate duct connection to the system pressure through a metering orifice and, in the process of seating, holds the pilot disc, to which it is mechanically coupled in tandem, off its seat. The pressure in the chamber common to the pilot and stabilizing discs immediately drops toward the exhaust or atmospheric pressure which causes a corresponding drop in the cylinder space on the back side of the main valve-actuating piston. System pressure on the front of the piston drives it in a direction to open the main relief valve. System pressure on the closed stabilizing disc holds that valve closed which in turn holds the pilot valve open. When the system pressure drops to the desired level, the adjustable spring which urges the pilot valve closed will overcome the force of system pressure on the stabilizing valve to close the pilot valve and open the stabilizing valve. A pressure drop across the metering orifice further reduces the force to be overcome by the spring as the stabilizing valve cracks open and positive chatter-free operation results.

Control means can also be provided in accordance with the invention to offset possible variations in the pressure of the atmospheric vent which would normally cause changes in calibration. In addition, remote control means, which can be operated, for example, either by a pneumatic or electrical system, can be provided for operating the relief valve at any time through a coupling to the disc of the pilot valve.

BRIEF DESCRIPTION OF THE DRAWINGS

Referring to FIG. 1, the invention is illustrated as embodied in a safety relief valve system which includes a main housing 10 having a pressure conduit 11 adapted to be coupled to the system to be protected by means of a coupling flange 10a and having an outlet port 12 adapted to be coupled, for example, to an atmospheric vent line by means of a coupling flange 10b. Between the pressure conduit 11 and exhaust port 12 is a main pressure relief valves 13 including a main valve disc 13a, an annular seat 13b, and a valve stem 13c, with the back side of the main disc facing the pressure conduit so that the pressure within the system drives the disc against its seat more and more tightly in sealing relationship as the system pressure rises. The valve stem 13c passes slidably through a guide 14 which is part of a cylinder head 15 of a pressure cylinder 16. The valve stem 13c is coupled to a piston 17 and assumes the function of a piston rod.

Figure 1:
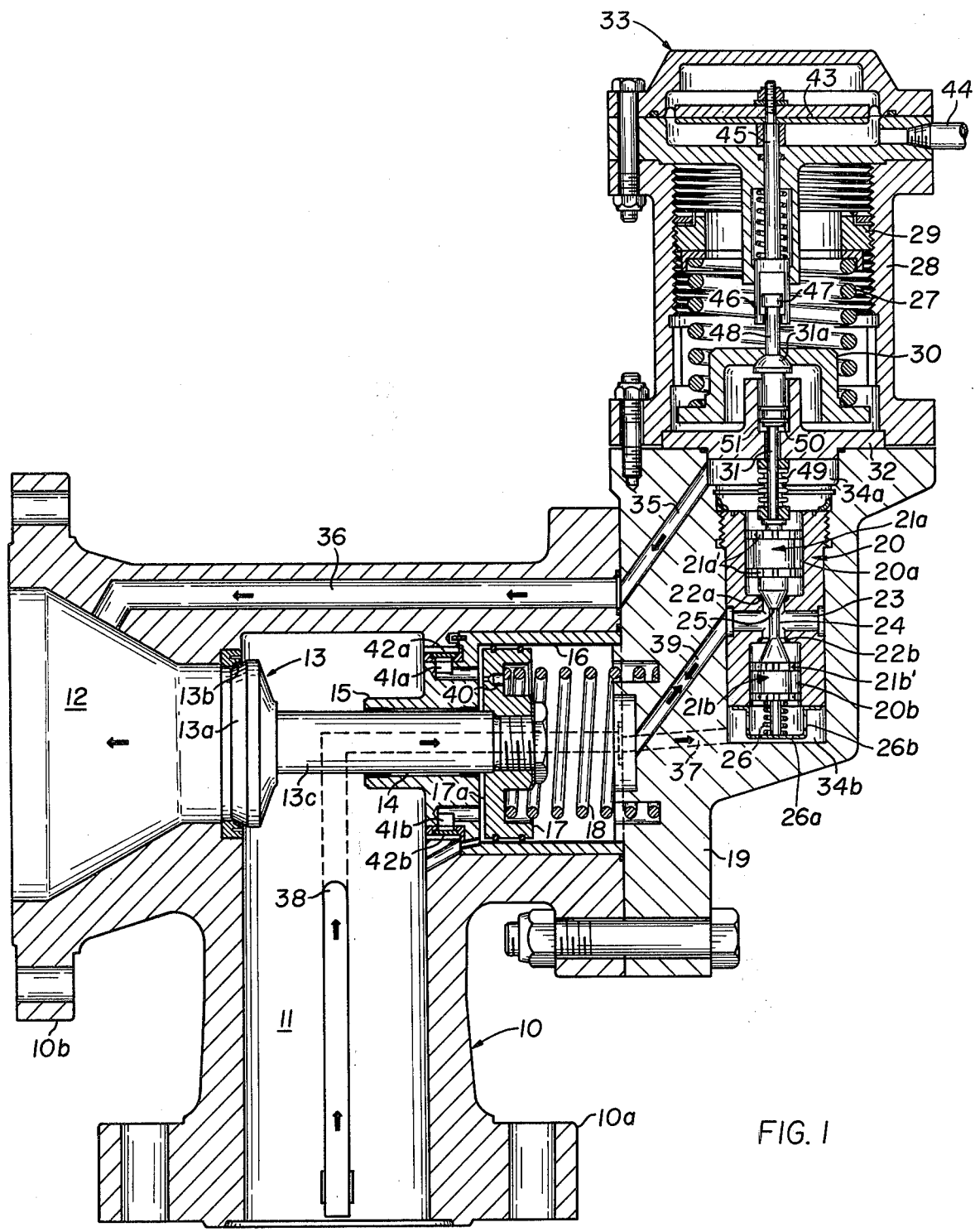
FIG. 1 is a view in cross-section through a self-actuated pilot-controlled relief valve formed in accordance with the invention, but showing various valves and valve stem parts in elevation.

The front or high pressure surface 17a of the piston 17 has an area larger by a predetermined amount than that of the valve disc 13a to which it is coupled. The piston 17 is urged toward the cylinder head (to the left as viewed in the drawing) by a compression spring 18 reacting against a secondary housing 19. The spring 18 and the fluid pressure in the system thus operate in parallel to effect seating of the main valve, with the spring insuring continuous seating of the valve when the system is not under pressure. Fitted removably (for servicing) within the secondary housing 19 is a pilot and stabilizing valve assembly 20 which dictates the operation of the main valve. The valve assembly 20 includes a first cylindrical member 20a which slidably receives a pilot disc 21a which operates in conjunction with a seat 22a, and a second cylinder 20b, axially aligned with the first, in which is mounted a stabilizing disc 21b which operates in conjunction with a seat 22b. The flange portions 21a' and 21b' of the discs which engage the cylinder walls are slotted to pass fluid around the disc bodies so that they do not function as pistons. The two valve cylinders 20a and 20b communicate with a common pressure chamber 23. The two discs 21a and 21b are separably coupled by an upstanding stem projection 24 on the disc 21b shown in the drawing as pressing upwardly against the bottom face of the disc 21a at an interface 25. The pilot disc 21a is shown seated and the stabilizing disc unseated in their respective inactive positions. In this mode, the stabilizing disc 21b is pushed downward and open by the closed pilot valve. At the lower end of the disc 21b is a fluid metering and disc support assembly 26 including a support member 26a having one or more metering orifices 26b. The support member forms an abutment for a small compression spring 26c reacting against the underside of the disc 21b and held in place by a guide pin 26d secured to the support and slidably received in an axial bore (not shown) in the body of the disc.

The seating force for the pilot disc 21a is derived from a strong and adjustable valve spring 27 contained within a generally cylindrical housing 28 surmounting and detachably bolted to the control valve housing 19. The valve spring 27 reacts between a threaded pressure-adjusting nut 29 and a bearing cup 30 which seats on a rounded shoulder 31a on a valve spindle 31 attached to the pilot disc 21a within the cylindrical housing 20a which it enters through a sealing header 32. The compression force of the spring 27, and hence the release pressure of the system, is adjusted by removing a bolted cover assemby 31 and turning the threaded nut 29 to move it upward or downward in its threaded sleeve mounting.

The pressure duct system for actuating the pilot and stabilizing valve assembly includes an exhaust or low pressure chamber 34a on the upper side of the pilot disc 21a and a high pressure chamber 34b below the stabilizing disc 21b. Thus, there are three chambers associated with the valve assembly, including the two end chambers 34a and 34b and, as previously described, the common central chamber 23. The chamber 34a on the discharge or output side of the pilot disc 21a is connected by a duct 35 (in the control valve housing 19) and duct 36 (in the main valve housing 10) to the outlet or atmospheric vent port 12. The lower chamber 34b is connected to the main pressure conduit 11 through ducts 37 and 38. The common central chamber 23 is connected by a duct 39 to the cylinder 16 on the far or right-hand side of the piston 17 as viewed in FIG. 1. If desired, the two sides of the cylinder 16 can be connected directly through the piston 17 by a small orifice 40 which can function as a condensate drain and also as a means to maintain a small fluid flow through the valve assembly 20 during blow-down. The left-hand end of the cylinder is in turn connected to the main pressure conduit 11 through a pair of parallel conduits 41a and 41b, preferably including filters 42a and 42b. Thus, the left-hand end of the cylinder 16 operates at all times under full system pressure.

Under static conditions, with uniform pressure in the system, the right-hand end of the cylinder 16 also operates at full system pressure by virtue of the fluid path through the conduits 38 and 37, the chamber 34b, the orifice 26b, the cylinder 20b (around the disc body 21b by virtue of the slotted flanges 21b'), the chamber 23 and the conduit 39 to the right-hand end of the main cylinder 16. If used, the orifice 40 also affords a pressure equalization path across the piston. The upper chamber 34a is, however, sealed from system pressure by the closed pilot disc 21a so that that chamber operates at atmospheric (or other discharge) pressure. The stabilizing disc 21b is, as described, held in its open or unseated position by the force of the lower end of the pilot disc abutting against the upwardly extending stem projection 24.

In operation, assuming now that pressure is rising in the system, the pressure in the pressure conduit 11 will uniformly rise throughout all of the chambers with the exception of the upper chamber 34a. When the system pressure reaches the value which corresponds to the setting of the control spring 27, the pilot disc 21a will lift from its seat. Fluid flow paths are provided around the notched flanges 21a' of the body of the pilot disc 21a which places the central pressure chamber 23 in full communication with the upper chamber 34a when the pilot valve is open. Pressure will, therefore, first be relieved in the chamber 23 which will immediately reflect itself in decreasing pressure in the right-hand end of the cylinder 16 due to flow through the duct 39. This will in turn set up a pressure differential across the piston 17 offset slightly by the restricted flow through the piston orifice 40, if such is used, causing the piston to be driven to the opposite end of the cylinder. The main valve disc 13a will be immediately pulled from its seat with resulting blowdown to atmosphere.

Meantime, the dynamics of fluid flow around the stabilizing disc 21b and the small spring 26 will establish the force to drive it upwardly against its seat to isolate the lower pressure chamber 34b from the central chamber 23. The pressure differential across the stabilizing disc will hold it closed and at the same time will cause its stem projection 24 to hold the pilot disc 21a fully open against the force of the control spring 27. The piston chamber 16 will, therefore, remain vented to atmosphere at its right-hand end and the main control valve will be held open with the differential pressure across the piston 17 being maintained as blowdown continues. When pressure subsides in the system to the point dictated by the control spring 27, all valve elements will return to their initial positions and the system will be automatically conditioned for a subsequent blowdown procedure should the system pressure again rise. Operation of the pilot valve once opened is controlled by the stabilizing disc 21b which holds it open. The rate of closing of the pilot valve is controlled by the metered flow through the orifice 26b in the support member 26a, with the pressure drop in the space below the body of the stabilizing disc enabling it to lower itself and hence the pilot disc rapidly and without chatter as nominal system pressure is reached, thereby preventing unnecessarily long blowdown and waste of energy.

In the embodiment of FIG. 1, there is provided a mechanism for remotely operating the relief valve without regard to system pressure, although the system is inherently inoperative without any system pressure.

This is achieved by means of a pneumatic diaphragm 43 contained in the upper control housing 33 which can be flexed upwardly by means of pneumatic pressure. Pneumatic pressure control signals for this purpose are introduced by means of an air conduit 44 from a remote point. The diaphragm is in turn connected by a stem 45 extending downward through a seal to a plunger yoke 46, the lower fingers of which underlie the enlarged head 47 of a spindle extension 48 which is connected to or made part of the pilot disc spindle 31. As the diaphragm 43 is driven upwardly, the yoke 46 will lift the spindle to raise the pilot disc 21a from its seat to initiate the valve control action as described above in conjunction with system pressure actuation.

In the event of change in back pressure from whatever source in the normally pressure-free chamber 34a above the pilot disc 21a, it will be apparent that the pressure relief or blow-down calibration of the system will be changed to the extent of the resulting change in total closing pressure on the pilot disc. Variations in back pressure in accordance with the invention are relieved by means of a back pressure balancing bellows 49 coupled to the spindle 31 within the chamber 34a to impose an offsetting force on the spindle. In addition, the spindle 31 has a piston 50 formed thereon which operates in a cylinder 51 formed in the upper end of the sealing header 32. The purpose of the piston 50 is to provide a redundant means of achieving back pressure compensation should a bellows failure occur. It should also be understood that the back pressure compensation system will operate at the time of blowdown when substantial fluid flow is occurring through the upper chamber 34a which can result in pressure variations.

Figure 2:
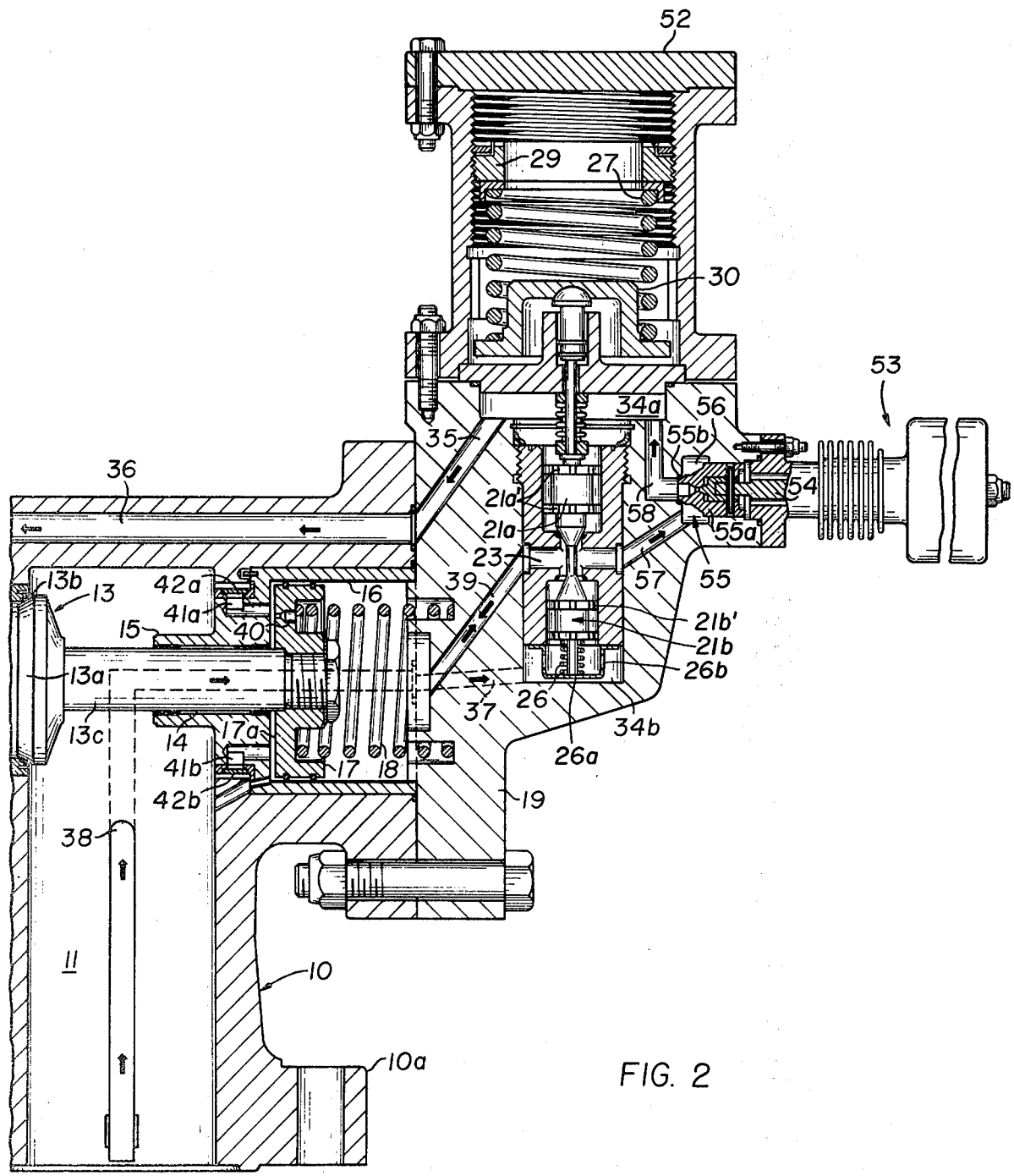
FIG. 2 is a view in cross-section through a self-actuated pilot-controlled relief valve showing a modification of the remote control mechanism.

Referring to FIG. 2, there is shown a portion of a substantially identical relief valve system but in which the pneumatic remote control system within the header assembly 33 of FIG. 1 is replaced by a bolted-on cap plate 52 and an electromagnetic solenoid assembly 53 attached to the upper end of the housing 19. The solenoid has its armature 54 coupled to a valve disc 55a which operates in conjunction with a seat 55b to define a pressure chamber 56. A duct 57 connects the chamber 56 to the central pressure chamber 23 and a duct 58 connects the output or low pressure side of the valve to the upper chamber 34a which vents to the atmosphere. When the solenoid is actuated by an electrical signal from a remote point, the valve assembly 55 will open, placing the pressure chamber 23 into direct communication with the atmospheric vent. This in turn will lower the pressure in the right-hand side of the cylinder 16, and the main valve 13a will be pulled open by the piston 17 to vent the system. Because the impedance of the flow path from the right-hand end of the cylinder 16 to atmosphere is substantially less than the impedance of the piston orifice 40, the main valve will remain open until such time as the solenoid-controlled valve 55 is closed.

It will be understood, however, that in the arrangement of FIG. 2, as in the case of the pneumatic control arrangement of FIG. 1, no motions or actions will occur in the system unless it is under pressure. This is so because all of the energy for actuating both the main relief valve and the pilot and control valve assemblies is derived from the fluid pressure of the system which is being protected. Also, because initial actuation of the pilot valve is dependent on static pressures and forces, rather than pressure differentials and forces derived from the pressure drops inherent in dynamic or flowing systems, the relief valve will operate with a wide range of fluids, both gaseous and liquid, without requiring readjustment. The dynamics of flowing conditions inherent in blow-down do, however, function to achieve an interplay of forces which assures full opening pop-action of the main valve. Because of the relationship of the flow paths in the vicinity of the pilot and control discs 21a and 21b, relatively large amounts of fluid leakage can be tolerated at the pilot valve without producing an unprogrammed and highly costly blow-down of the system.

The valve subassembly 19 and 20 of FIGS. 1 and 2 can be used as an independent, direct acting, pressure relief device in which the pilot disc 21a operates as the main relief or blow-down valve. The duct or conduit 39 becomes the inlet conduit and would be connected to system pressure, with the conduit or ducts 35 and 36 serving as the atmospheric vent. The disc 21a engages its seat 22a under the force of the adjustable compression spring 27 which then determines the unseating or blow-down pressure.

The action of the spring-loaded relief disc 21a is modified by the stabilizing disc 21b, the upwardly extending stem 24 of which normally abuts the bottom of the disc 21a. Thus, with the disc 21a seated against system pressure, the stabilizing disc 21b is held away from its seat 22b. The common chamber 23 between the two discs is connected to the inlet by means of the duct 39 which, in order for the stabilizing disc 21b to operate most effectively, should include an element of flow impedance which can take the form, for example, of a pressure-dropping orifice (not shown) so that a pressure drop is insured in the chamber 23 under blow-down conditions. The degree of the impedance, it should be understood, is related to the impedance of the fluid flow from the chamber 23 to atmosphere (through the circuit including the valve seat 22a, the space around the body of the disc 21a, the chamber 34a, and the ducts 35 and 36). The lower this discharge impedance, the lower will be the pressure in the chamber 23 as blow-down begins so that the pressure drop from system pressure through the duct 39 is relatively less important. A high discharge circuit impedance would, therefore, dictate a discrete orifice in the duct 39.

In operation, system pressure will appear throughout the valve assembly at all points below the closed valve disc 21a on its seat 22a. A rise in system pressure to a point corresponding to the setting of the control spring 29 will unseat the main disc 21a venting the common chamber 23 to atmosphere to set up fluid flow through the two parallel paths, including the duct 39 and the duct 37 to the chamber below the stabilizing disc 21b. In lifting from its seat 22a, the disc 21a will be tracked due to the spring 26 by the stabilizing disc 21b, the upstanding stem 24 of which abuts its lower face. Fluid flow will start in both branches of the fluid circuit, the principal flow being the blow-down flow through the ducts 39 and 35 and 36 to atmosphere. The combination of flow through the orifice 26b and then around the stabilizing disc 21b and the force of the spring 26 will cause the stabilizing disc 21b to snap closed against its seat 22b, thereafter to hold the main disc 21a open due to static fluid pressure below the closed stabilizing disc 21b and pressure close to atmosphere above. As system pressure drops to the nominal or closing value, the main disc 21a will seat under the force of its spring and, in so doing, will push the stabilizing disc 21b open, with the orifice 26 imposing a pressure drop in the space below the stabilizing disc for that transient period during which both the main disc 21a and the stabilizing disc 21b are partly open. Thus, the stabilizing disc will quickly snap to full-open position and will allow the main disc to snap closed under the controlling force of its compression spring 27.

As in the arrangements of FIGS. 1 and 2, the disc 21a together with its regulating apparatus is fail-safe open in the event of failure of any of its component parts. If, for example, the adjustable compression spring 27 were to fracture, the system would blow-down as opposed to failing to operate when system pressure exceeded the nominal value.

While the invention has been described above having reference to preferred embodiments thereof, it will be understood that it can take other forms and arrangements within the scope of the invention. In the arrangements of FIGS. 1 and 2, for example, the modulating effects of the orifice 40 (if used) in the piston 17, which tends to slow piston travel in either direction, can be achieved by a similarly restricted orifice in a path either through the cylinder housing from one end of the cylinder to the other or by means of calculated leakage paths built into the piston rings. The invention should not, therefore, be regarded as limited except as defined in the following claims:

We claim:

1. A self-actuated pilot-controlled pressure responsive valve for fluid pressure systems comprising:
   (a) a main pressure chamber having a main valve seat and a main valve disc normally seated thereon, and the back side of which is exposed directly to system pressure to force the disc against its seat to seal the pressure chamber from the outlet space;
   (b) a piston and cylinder assembly having its piston coupled to the main valve disc to impose thereon, when activated, opening forces exceeding the normal seating force;
   (c) first and second duct means to introduce substantially balanced fluid pressure from the system respectively into the cylinder on opposite sides of the piston;
   (d) a pilot valve assembly to operate the piston and interposed in a fluid path between the cylinder on one side of the piston and a pressure reference substantially below system pressure, including a pressure chamber connected to the cylinder, a pilot valve seat and a calibrated spring-biased pilot disc normally seated thereon against the chamber pressure whereby, upon opening in response to predetermined elevated system pressure, a pressure differential is established across the piston to unseat the main valve disc, a control disc seat and a control disc adapted to seat thereon interposed in a fluid path between system pressure and the said pressure chamber and forming part of the second duct means to one side of the piston, and means to connect the control disc to the pilot disc, whereby upon opening of the pilot disc valve the control disc seats under system pressure to isolate the chamber and one side of the piston from system pressure; and back pressure compensating means in the outlet space for the pilot valve and responsive to increased pressure in the outlet space to apply a force to the pilot disc opposing that derived from the back pressure.

2. Apparatus according to claim 1, said compensating means including a spindle attached to the pilot disc and a piston connected to the spindle exposed to the pressure in the outlet space.

3. Apparatus according to claim 2, including a pressure bellows applied to the spindle in the outlet space to apply further compensating force to the pilot disc.

4. Apparatus according to claim 1, including a pressure-dropping orifice in the second duct means between the source of system pressure and the control disc, whereby system pressure on the control disc drops when it cracks open, thereby reducing the opposing load on the calibrated spring-biased pilot disc to effect prompt closure of the pilot disc when the desired reduction in system pressure obtains.

* * * * *